US012199994B2

(12) United States Patent
Ron et al.

(10) Patent No.: US 12,199,994 B2
(45) Date of Patent: Jan. 14, 2025

(54) GENERATING SECURITY RESPONSE RECOMMENDATIONS

(71) Applicant: International Business Machines Corporation, Armonk, NY (US)

(72) Inventors: Aviv Ron, Klachim (IL); Yuval Lapidot, Beer Sheva (IL); Alon Freund, Maale Adumim (IL); Bar Haim, Sufa (IL); Ilgen Banu Yuceer, London (GB); Amit Haim, Bat Yam (IL)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 18/068,697

(22) Filed: Dec. 20, 2022

(65) Prior Publication Data
US 2024/0205238 A1 Jun. 20, 2024

(51) Int. Cl.
G06F 21/55 (2013.01)
G06F 21/56 (2013.01)
G06F 21/57 (2013.01)
H04L 9/40 (2022.01)

(52) U.S. Cl.
CPC ........ H04L 63/1416 (2013.01); G06F 21/554 (2013.01); G06F 21/566 (2013.01); G06F 21/577 (2013.01); H04L 63/1433 (2013.01); H04L 63/1441 (2013.01)

(58) Field of Classification Search
CPC .... G06F 21/554; G06F 21/566; G06F 21/577; H04L 63/1416; H04L 63/1433; H04L 63/1441
See application file for complete search history.

(56) References Cited

U.S. PATENT DOCUMENTS

| 10,673,880 | B1* | 6/2020 | Pratt | H04L 63/1425 |
|---|---|---|---|---|
| 10,721,266 | B1 | 7/2020 | Herman-Saffer et al. | |
| 2007/0226796 | A1* | 9/2007 | Gilbert | G06F 21/577 726/25 |
| 2018/0219888 | A1* | 8/2018 | Apostolopoulos | G06F 21/554 |
| 2020/0067985 | A1 | 2/2020 | Bhargava et al. | |
| 2021/0152574 | A1 | 5/2021 | Maida et al. | |
| 2021/0385123 | A1 | 12/2021 | Friedrichs et al. | |
| 2021/0398001 | A1 | 12/2021 | Forte et al. | |

(Continued)

OTHER PUBLICATIONS

S. Noel et al., "CyGraph: Graph-Based Analytics and Visualization for Cybersecurity," Handbook of Statistics, ResearchGate, Dated: Jan. 2016, pp. 1-51 http://dx.doi.org/10.1016/bs.host.2016.07.001.

(Continued)

Primary Examiner — Shirley X Zhang
(74) Attorney, Agent, or Firm — Patterson + Sheridan, LLP

(57) ABSTRACT

Techniques are provided for generating security response recommendations. In one embodiment, the techniques involve receiving scoring functions, a logical operator selection, a security graph, and external threat intelligence, generating a search pattern based on the scoring functions and the logical operator selection, evaluating the search pattern against a selected node of the security graph to identify a potential security threat represented by the security graph at the selected node, and generating a recommendation based on the evaluation and the external threat intelligence.

20 Claims, 8 Drawing Sheets

(56) References Cited

U.S. PATENT DOCUMENTS

2022/0053016 A1    2/2022  Trost et al.
2022/0067097 A1*   3/2022  Gupta ................. G06F 21/6218
2022/0374434 A1*  11/2022  Nash .................... G06F 21/566

OTHER PUBLICATIONS

Jeremy Jurgens et al., "Global Cybersecurity: Outlook 2022: Insight Report," World Economic Forum, Dated Jan. 2022, pp. 1-35.

* cited by examiner

FIG. 7B

*(rotated view)* Screen 700:

The host has a related finding.  
Add to case +  
Dismiss −

Related findings timeline  Starred activity only ⦿  View details ☆

Jun 03, 2021 06:59:35 AM  
Large Outbound Transfer Slow Rate of Transfer  
Detects a single host that is sending more data out of the network than received. This rule detects over 2 MB of data transferred over a 2 hour period. This is fairly slow and could indicated stealthy data leakage.

Related assets  
[IP address 2] [IP address 1]

712: This recommendation has a 67% confidence rating.

GENERATING SECURITY RESPONSE RECOMMENDATIONS

BACKGROUND

The present invention relates to threat management, and more specifically, to generating security response recommendations based on security threats represented by a security graph.

SUMMARY

A method is provided according to one embodiment of the present disclosure. The method includes receiving scoring functions, a logical operator selection, a security graph, and external threat intelligence; generating a search pattern based on the scoring functions and the logical operator selection; evaluating the search pattern against a selected node of the security graph to identify a potential security threat represented by the security graph at the selected node; and generating a recommendation based on the evaluation and the external threat intelligence.

A system is provided according to one embodiment of the present disclosure. The system includes a processor; and memory or storage comprising an algorithm or computer instructions, which when executed by the processor, performs an operation that includes: receiving scoring functions, a logical operator selection, a security graph, and external threat intelligence; generating a search pattern based on the scoring functions and the logical operator selection; evaluating the search pattern against a selected node of the security graph to identify a potential security threat represented by the security graph at the selected node; and generating a recommendation based on the evaluation and the external threat intelligence.

A computer-readable storage medium having computer-readable program code embodied therewith, the computer-readable program code executable by one or more computer processors to perform an operation, is provided according to one embodiment of the present disclosure. The operation includes receiving scoring functions, a logical operator selection, a security graph, and external threat intelligence; generating a search pattern based on the scoring functions and the logical operator selection; evaluating the search pattern against a selected node of the security graph to identify a potential security threat represented by the security graph at the selected node; and generating a recommendation based on the evaluation and the external threat intelligence.

BRIEF DESCRIPTION OF THE DRAWINGS

FIGS. 7A-7B illustrate a recommendation generation environment, according to one embodiment.

DETAILED DESCRIPTION

Figure 1:
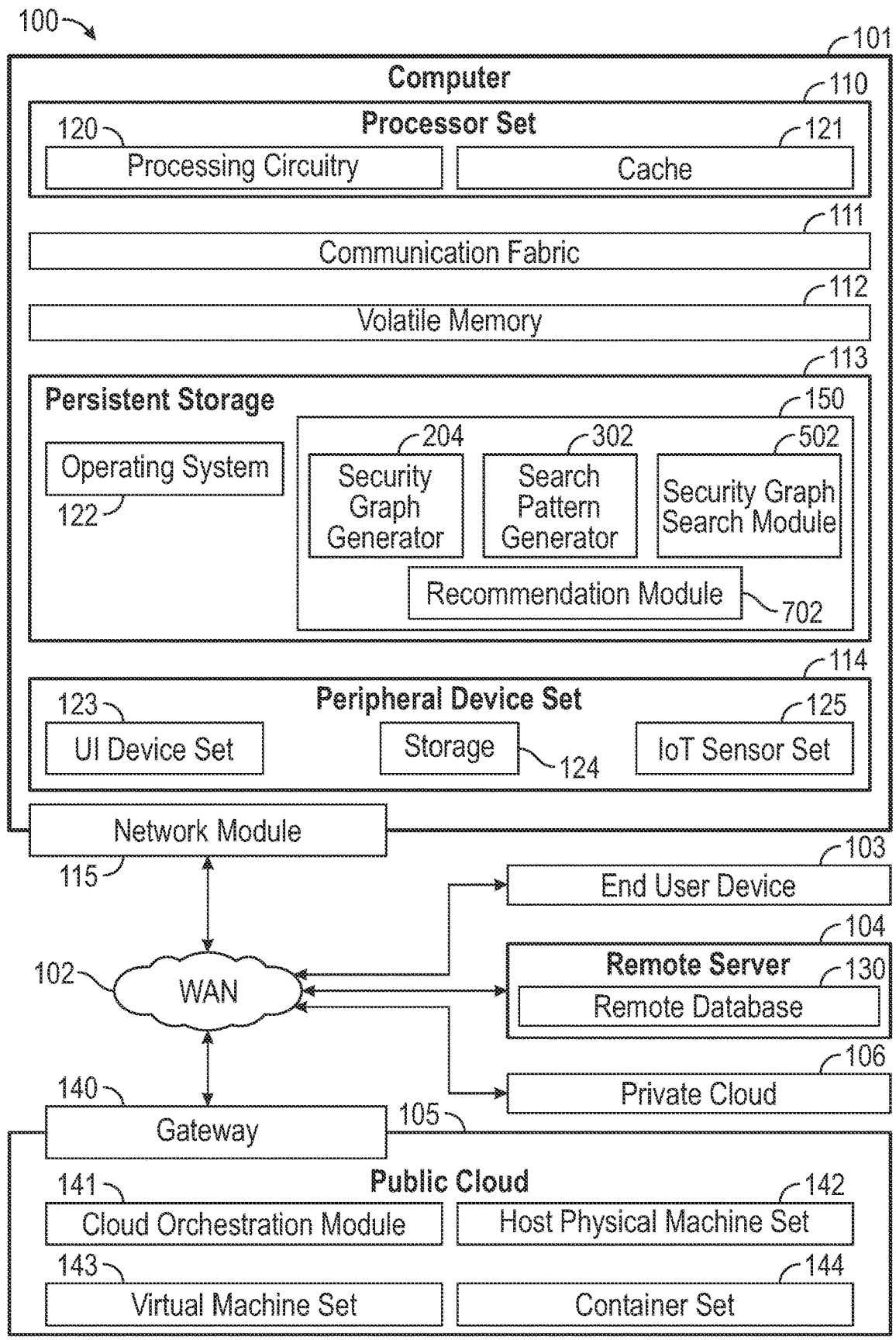
FIG. 1 illustrates a computing environment, according to one embodiment.

Traditional processes for managing security operations involve manually investigating previous security incidents, and creating general playbooks for security professionals to follow to mitigate future security incidents. However, the playbooks typically offer checklists to deal with families of security incidents, which are generally not effective as specific solutions to given incidents. Further, because these processes are performed by humans, managing security operations can be slow, error-prone, and inconsistent, depending on the training and experience of the security professionals, and the volume and complexity of the security incidents.

Embodiments of the present disclosure improve upon managing security operations by automating the analysis process, and generating incident-specific recommendations. In one embodiment, a search pattern generator creates search patterns that represent specific security threats. A security graph search module then uses the search patterns to identify security threats represented in a security graph. Afterwards, a recommendation module generates a recommendation based on the identified security threats.

Benefits of the disclosed embodiments include increasing the accuracy and consistency of security management operations. Further, embodiments of the present disclosure can increase the speed of the work product output of security professionals, thereby reducing costs and increasing the scalability of managing security operations.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to one embodiment. Computing environment 100 contains an example of an environment for the execution of at least some of the computer code involved in performing the inventive methods, such as new security response recommendation module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
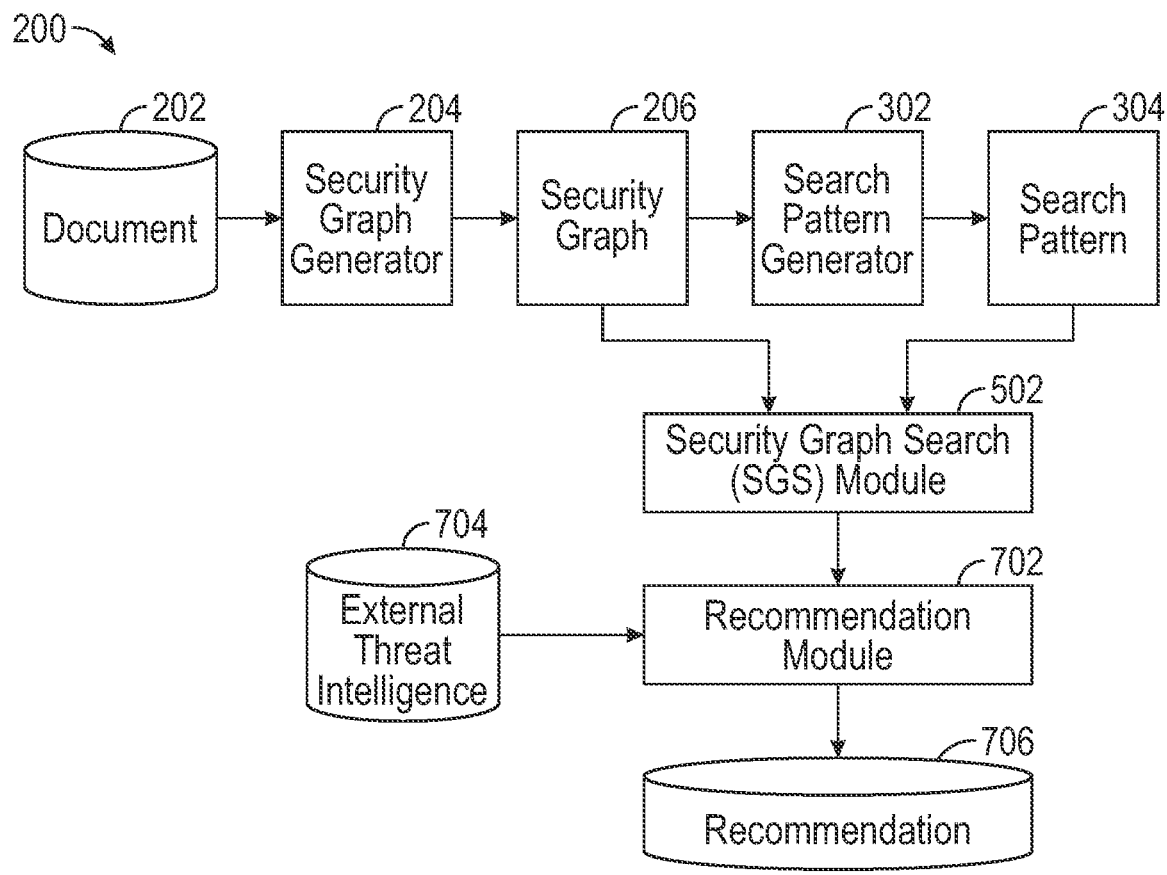
FIG. 2 illustrates a security response recommendation generation environment, according to one embodiment.

FIG. 2 illustrates a security response recommendation generation environment 200, according to one embodiment. In the illustrated embodiment, the security response generation environment 200 includes a document 202, a security graph generator 204, a security graph 206, a search pattern generator 302, a search pattern 304, a security graph search (SGS) module 502, recommendation module 702, external threat intelligence 704, and a recommendation 706. In one embodiment, the security response recommendation module 150, security graph generator 204, search pattern generator 302, SGS module 502, and recommendation module 702 are software modules, or sets of computer instructions, executed by the processor set 110 to perform the operations described herein.

In one embodiment, the document 202 is a log that includes a list of recorded actions recognized by the operating system 122 or a software application executed by the processor set 110. The recorded actions can include information such as the date and time, resource and file accesses, computer processes and applications, network information, and the like, that are associated with a security threat.

The security graph generator 204 can parse the document 202, and generate a bidirectional security graph 206 that represents the contents of the document 202 (as well as the contents of other parsed documents or logs). In one embodiment, each node of the security graph 206 represents an artifact such as a computer process, file, directory, network traffic, domain, URL, registry key, email address, host network, logged event, autonomous system, IP address, user account, X.509 certificate, and the like.

The security graph 206 can also include metadata associated with each node. In one embodiment, the metadata includes information from the document 202, and information related to the artifacts, to provide context to the nodes. For instance, the metadata may include information about the relationship of an IP address to a family of known, compromised IP addresses. The metadata can also include alerts about known indicators of compromise or vulnerabilities associated with the artifacts represented by the nodes.

The edges between two nodes of the security graph 206 can indicate a relationship between the artifacts represented by the nodes such as a process parent, process child, process binary, process binary or executable, process host device, process communication network, network traffic source, network traffic destination, DNS server or client, IP address corresponding to a DNS resolution, DNS query domain, directory contents, and the like. In one embodiment, information about the relationship can be stored in the respective metadata of the two nodes.

The search pattern generator 302 can combine multiple scoring functions to create a search pattern 304 that represents a security threat. In one embodiment, a scoring function is a software function that receives a node of the security graph 206 as an input, and outputs a threat score ranging between 0 to 1 to indicate a threat level of the node. This process is described in further detail in FIG. 4. In one embodiment, the search pattern 304 is represented as a binary tree, where the leaves are scoring functions and the inner nodes are operators used to combine the scoring functions.

The SGS module 502 can compare each combination of nodes and edges in the security graph 206 to the search pattern 304 to determine if the security threat represented by the search pattern 304 is found in the security graph 206. This process is described in further detail in FIG. 6. In one embodiment, the SGS module 502 alerts the recommendation module 702 when the security threat is found.

Upon receiving the alert, the recommendation module 702 can generate a recommendation 706 that includes a human-readable instructions or suggestions to resolve the security threat. The recommendation module 702 can also analyze external threat intelligence 704 to provide additional information on dealing with the security threat. For instance, the recommendation module 702 can provide a security operator with an impact analysis along with the recommendation 706. This process is described in greater detail in FIG. 8.

Figure 3:
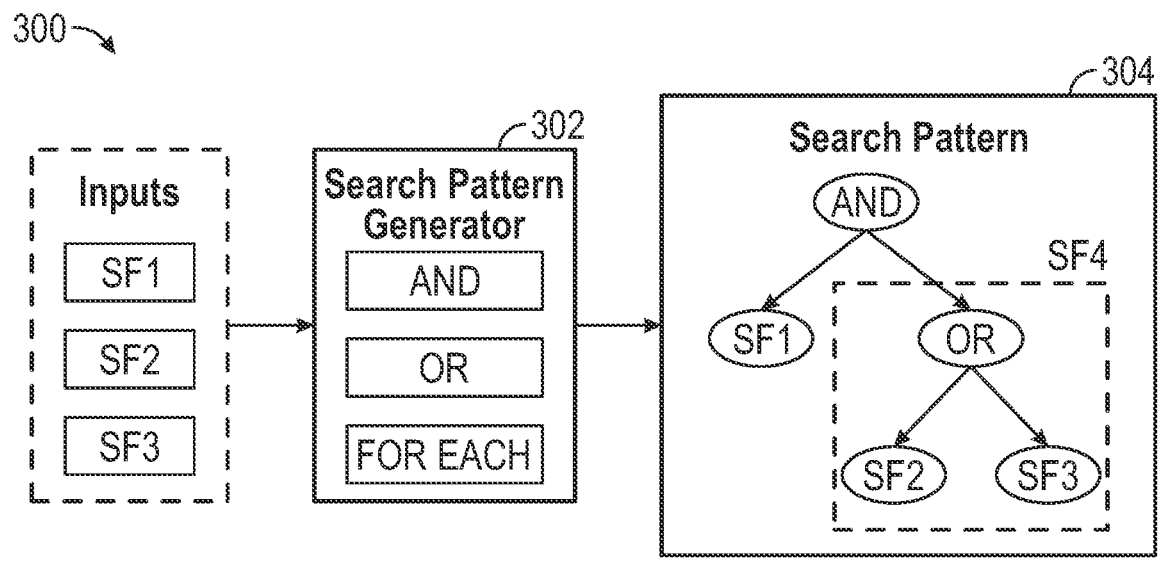
FIG. 3 illustrates a search pattern generation environment, according to one embodiment.
Figure 4:
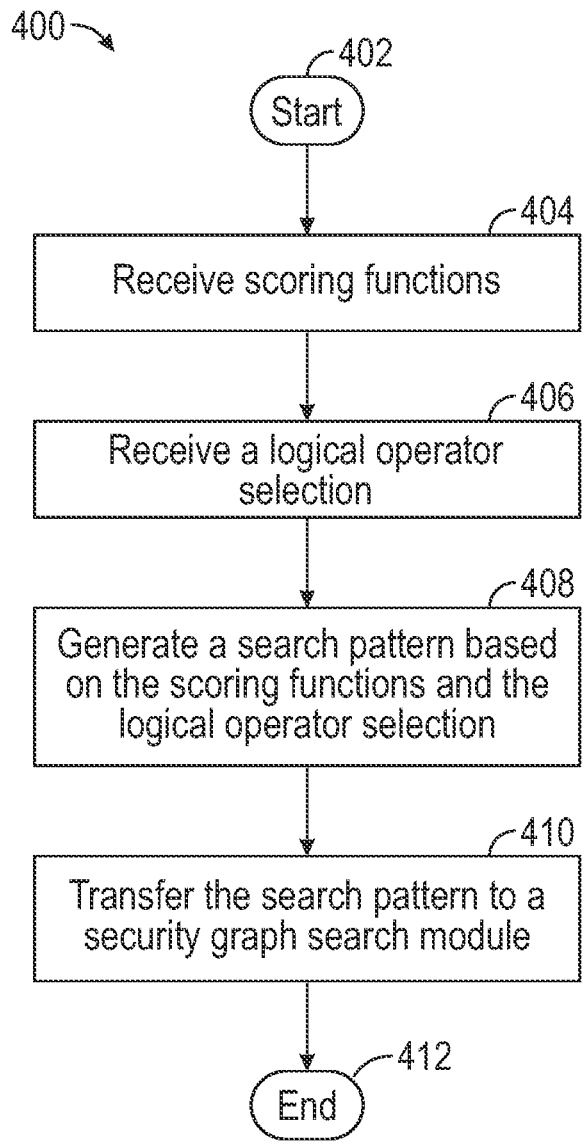
FIG. 4 illustrates a flowchart of a method of generating a search pattern, according to one embodiment.

FIG. 3 illustrates a search pattern generation environment 300, according to one embodiment. FIG. 4 illustrates a flowchart of a method of generating a search pattern 400, according to one embodiment. FIG. 3 is explained in conjunction with FIG. 4.

The method 400 begins at block 402. At block 404, the search pattern generator 302 receives scoring functions. In the embodiment illustrated in FIG. 3, the inputs to the search pattern generator 302 include scoring functions SF1, SF2, and SF3.

In one embodiment, a scoring function is a software function that receives a node of the security graph 206 as an input, and uses the information or alerts from the metadata of the node to determine a threat score of the node. For instance, the scoring function may consider a relationship between a file and a URL that may link to an illegitimate website, along with multiple alerts about the file and the URL, as described in the metadata associated with the node. After assessing the metadata, the scoring function outputs a threat score for the node between the range of 0 and 1.

The scoring function can also include a threshold value to evaluate the threat score. In one embodiment, when the threat score exceeds the threshold, the output of the scoring function is deemed to be a "pass" value. When the threat score does not exceed the threshold, the output of the scoring function is deemed to be a "fail" value.

In one embodiment, a universal threshold value is applied to all scoring functions. Therefore, any function, module, or search pattern that uses the scoring function output can compare the output to the universal threshold in order to determine whether the output represents a "pass" value or a "fail" value. In another embodiment, each scoring function defines an internal threshold value. In this case, the scoring functions can output a pass/fail indicator, along with the threat score.

At block 406, the search pattern generator 302 receives a logical operator selection. The logical operator selection can include one of an AND, OR, or FOR EACH operator.

In one embodiment, the AND operator creates a new scoring function given two input scoring functions. The new scoring function outputs a "pass" value when input nodes cause each of the input scoring functions to output a "pass" value. The "pass" value of the new scoring function is a weighted average of the threat scores of the input scoring functions. The new scoring function outputs a "fail" value when the input nodes cause at least one of the input scoring functions to output a "fail" value. The "fail" value of the new scoring function can be a default value.

In one embodiment, the OR operator creates a new scoring function given two input scoring functions. The new scoring function outputs a "pass" value when input nodes cause at least one of the input scoring functions to output a "pass" value. The "pass" value of the new scoring function is a weighted average of the threat scores of the input scoring functions. The new scoring function outputs a "fail" value when the input nodes cause both of the input scoring functions to output "fail" values. The "fail" value of the new scoring function can be a default value.

In one embodiment, the FOR EACH operator creates a new scoring function given a first and second input scoring function, and an optional property search function. The property search function receives a node as an input, and returns a set of nodes that meets a criterion specified in the property search function. For instance, the criteria can require the returned nodes to have a specified edge type (e.g., a process child relationship) connected the input node.

When the property search function is provided, the new scoring function outputs a "pass" value when an input node causes the first input scoring function to output a "pass" value, and at least one of the nodes returned from the property search function causes the second input scoring function to output a "pass" value. The "pass" value of the new scoring function is a weighted average of the threat score of the first input scoring function, and the largest threat score among the second input scoring function for each node returned from the property search function that causes the second input scoring function to output a "pass" score. The new scoring function outputs a "fail" value when either the first or second input scoring function outputs a "fail" value. The "fail" value of the new scoring function can be a default value.

When the property search function is not provided, the new scoring function outputs a "pass" value when a first input node causes the first scoring function and the second scoring function to output respective "pass" values. The "pass" value of the new scoring function is a weighted average of threat scores of the first and second scoring functions. The new scoring function outputs a "fail" value when either the first or second input scoring function outputs a "fail" value. The "fail" value of the new scoring function can be a default value.

In one embodiment, a new scoring function is created from historical data that is not captured in the security graph 206. The new scoring function can be added to the search pattern 304 as an input node, as described at block 408 below.

In the embodiment illustrated in FIG. 3, the search pattern generator 302 receives scoring functions SF2 and SF3, along with OR operator selection. The search pattern generator 302 also receives scoring function SF1 and SF4, along with an AND operator selection.

At block 408, the search response generator 302 generates a search pattern 304 based on the scoring functions and the logical operator selection. The search pattern 304 can include any composition of scoring functions.

In the embodiment illustrated in FIG. 3, the search pattern generator 302 generates scoring function SF4 by performing the operation SF2 OR SF3. The search pattern generator 302 then generates a composite scoring function by performing the operation SF1 AND SF4. The resulting composite scoring function (SF1 AND (SF2 OR SF3)) is the search pattern 304.

At block 410, the search response generator 302 transfers the search pattern 304 to the security graph search module 502. The method 400 ends at block 412.

Figure 5:
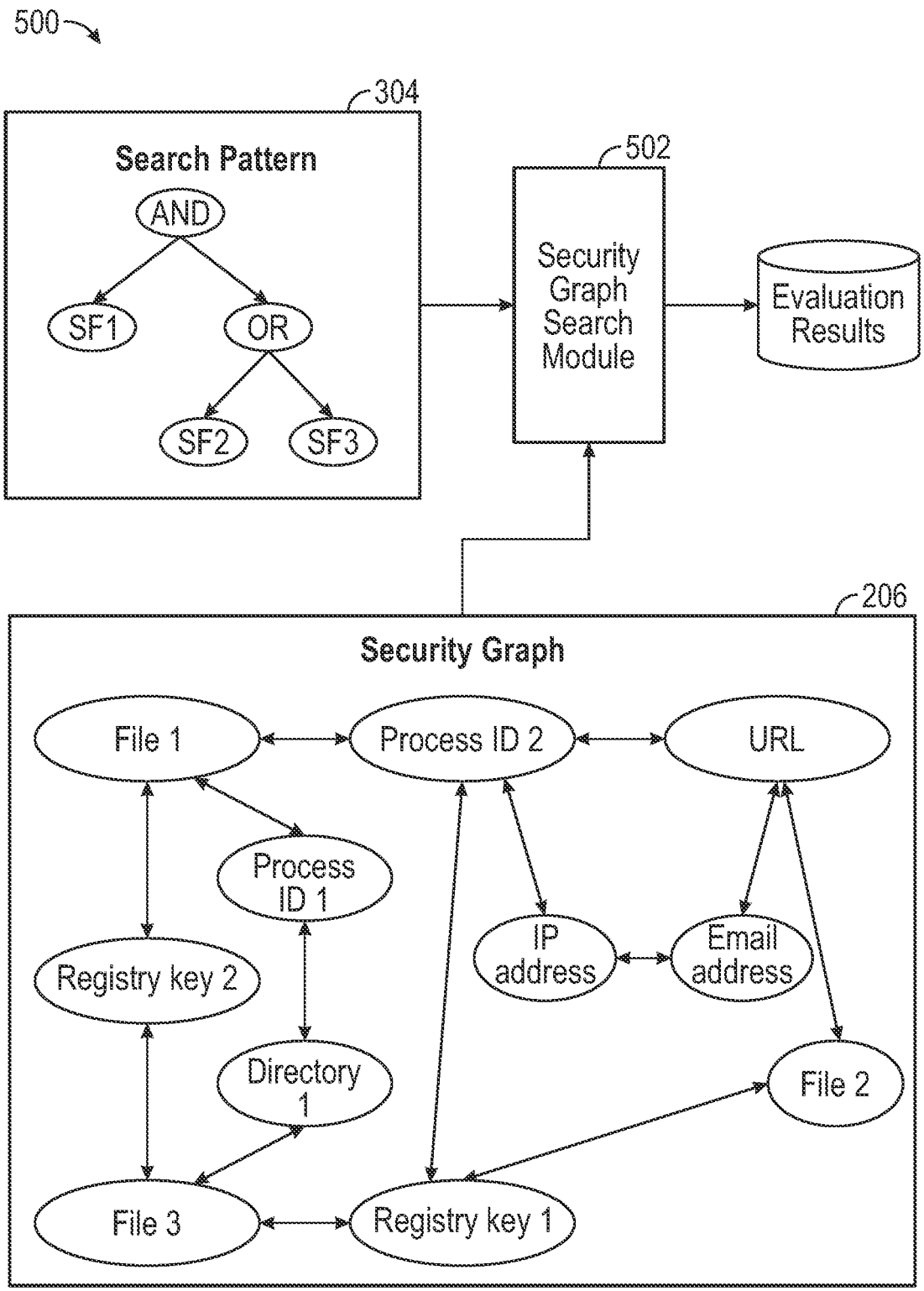
FIG. 5 illustrates a security graph search environment, according to one embodiment.
Figure 6:
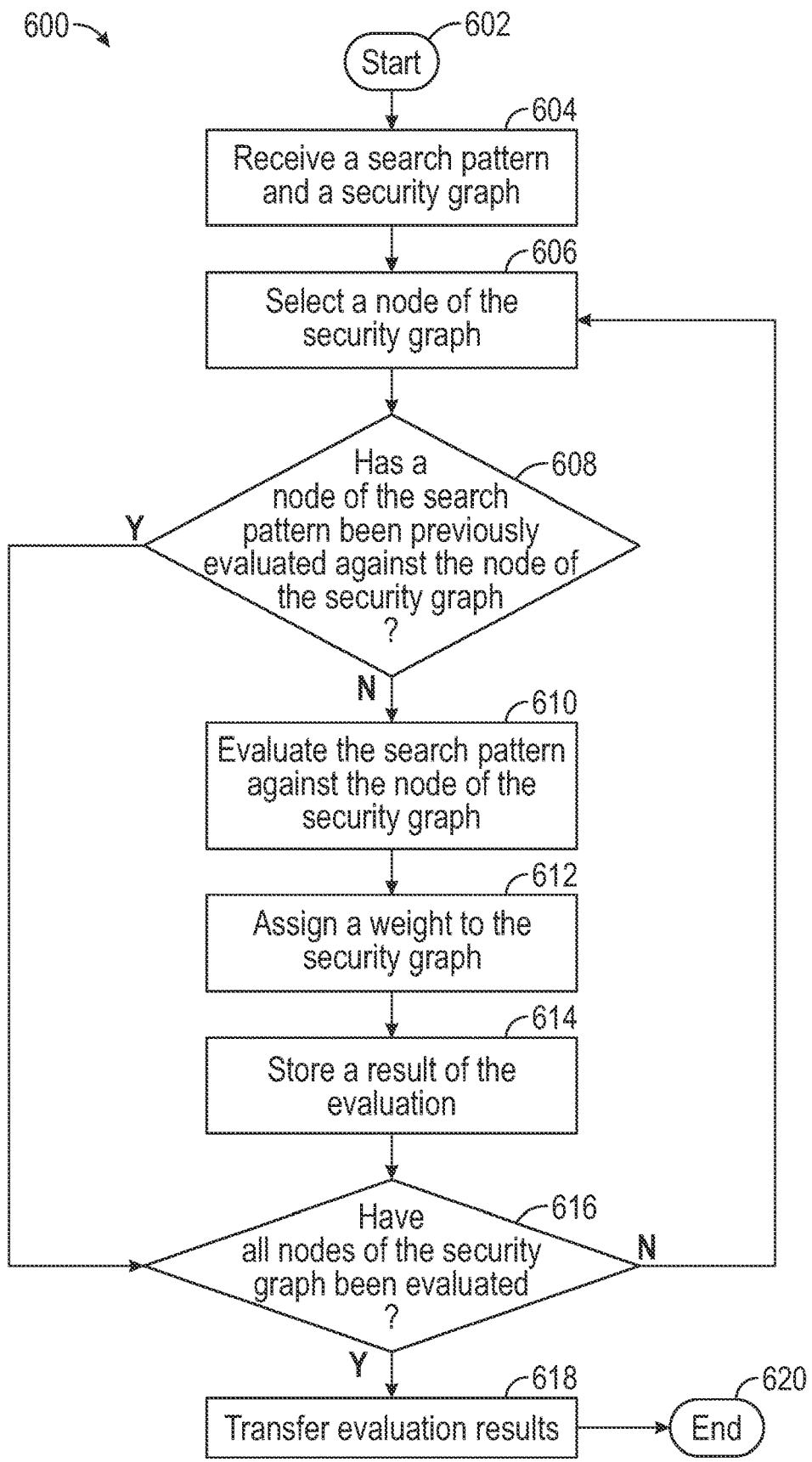
FIG. 6 illustrates a flowchart of a method of searching a security graph, according to one embodiment.

FIG. 5 illustrates a security graph search environment 500, according to one embodiment. FIG. 6 illustrates a flowchart of a method of searching a security graph 600, according to one embodiment. FIG. 5 is explained in conjunction with FIG. 6.

The method 600 represents one example by which the security graph search (SGS) module 502 searches for a search pattern in the security graph. In one embodiment, the SGS module 502 performs this search by evaluating the search pattern 304 against every node in the security graph 206. The method 600 begins at block 602.

At block 604, the SGS module 502 receives a search pattern 304 and a security graph 206. In the embodiment illustrated in FIG. 5, the search pattern 304 is represented as a binary tree, and the security graph 206 is represented as a bidirectional graph.

At block 606, the SGS module 502 selects a node of the security graph 206. In the embodiment illustrated in FIG. 5, the SGS module 502 may begin with the node "Process ID 1" of the security graph 206.

At block 608, the SGS module 502 determines whether any node of the search pattern 304 has been previously evaluated against the node of the security graph 206. Upon determining that a node of the search pattern 304 has been previously evaluated against the node of the security graph 206, the SGS module 502 retrieves the result of the evaluation from a memory or storage, and the method 600 proceeds to block 616. This process is described in greater detail below. However, returning to block 608, upon determining that the nodes of the search pattern 304 have not been previously evaluated against the node of the security graph 206, the method 600 proceeds to block 610.

At block 610, the SGS module 502 evaluates the search pattern 304 against the node of the security graph 206. In one embodiment, the threat score output of the root node of the search pattern 304 represents the output of the search pattern 304 when evaluated against the node of the security graph 206. In the embodiment illustrated in FIG. 5, search pattern 304 is illustrated as a binary tree representation of: SF1 AND (SF2 OR SF3). Hence, the SGS module 502 first inputs the node ("Process ID 1") of the security graph 206 into SF2 and SF3. Afterwards, the SGS module 502 performs an OR operation on the output threat scores of SF2 and SF3. The SGS module 502 then inputs the "Process ID 1" node into SF1, and performs an AND operation with the threat score output of SF1 and the output of the previous OR operation. Therefore, the AND operation outputs a threat score for the search pattern 304 evaluated against this node of the security graph 206.

At block 612, the SGS module 502 assigns a weight to security graph 304. In one embodiment, when evaluated against the node, the weight of the search pattern 304 is the weighted average of the threat scores of the inner nodes (i.e., all scoring functions) of the search pattern 304. The weighing process for the inner nodes was described at block 406 of FIG. 4.

Because the threat score output of the root node is determined using the threat score outputs of the inner scoring functions of the search pattern 304, the output of the root node represents a likelihood that the scoring functions output a threat score above the respective thresholds of the scoring functions. Hence, since the search pattern represents a security threat, the output of the root node can represent a confidence rating for the existence of the security threat identified by the search pattern 304 at the evaluated node of the security graph 206. Put differently, the confidence rating represents an assurance that a security threat identified in the security graph 206 is legitimate.

At block 614, the SGS module 502 stores a result of the evaluation. The result can be a threat score or confidence rating stored in volatile memory 112, persistent storage 113, or the like. In one embodiment, the SGS module 502 caches each result in a table or dictionary that maps the result to a corresponding scoring function of the search pattern 304 and node of the security graph 206.

The SGS module 502 can use the cached result to skip additional workloads, thereby ensuring that the evaluation of search pattern 304 against the node of the security graph 206 remains efficient. That is, because the threat score output of a given scoring function does not change when processing the same node of the security graph 206, it is redundant to evaluate the same scoring function of the search pattern 304 against the same node of the security graph 206 more than once. This scenario may occur, for example, when a search pattern includes multiple instances of the same scoring function. Therefore, as mentioned above at block 608, upon determining that a node of the search pattern 304 has been previously evaluated against the node of the security graph 206, the SGS module 502 retrieves the result of the evaluation from memory or storage. As a result, each scoring function of the search pattern 304 is evaluated against each node of the security graph 206 only once.

At block 616, the SGS module 502 determines whether all nodes of the security graph 206 have been evaluated. Upon determining that at least one node of the security graph 206 has not been evaluated, the method proceeds to block 606, where another node of the security graph 206 is selected for evaluation. However, returning to block 616, upon determining that all nodes of the security graph 206 have been evaluated, the method 600 proceeds to block 618, where the SGS module 502 transfers the evaluation results to a recommendation module 702. The method 600 ends at block 620.

Figure 7A:
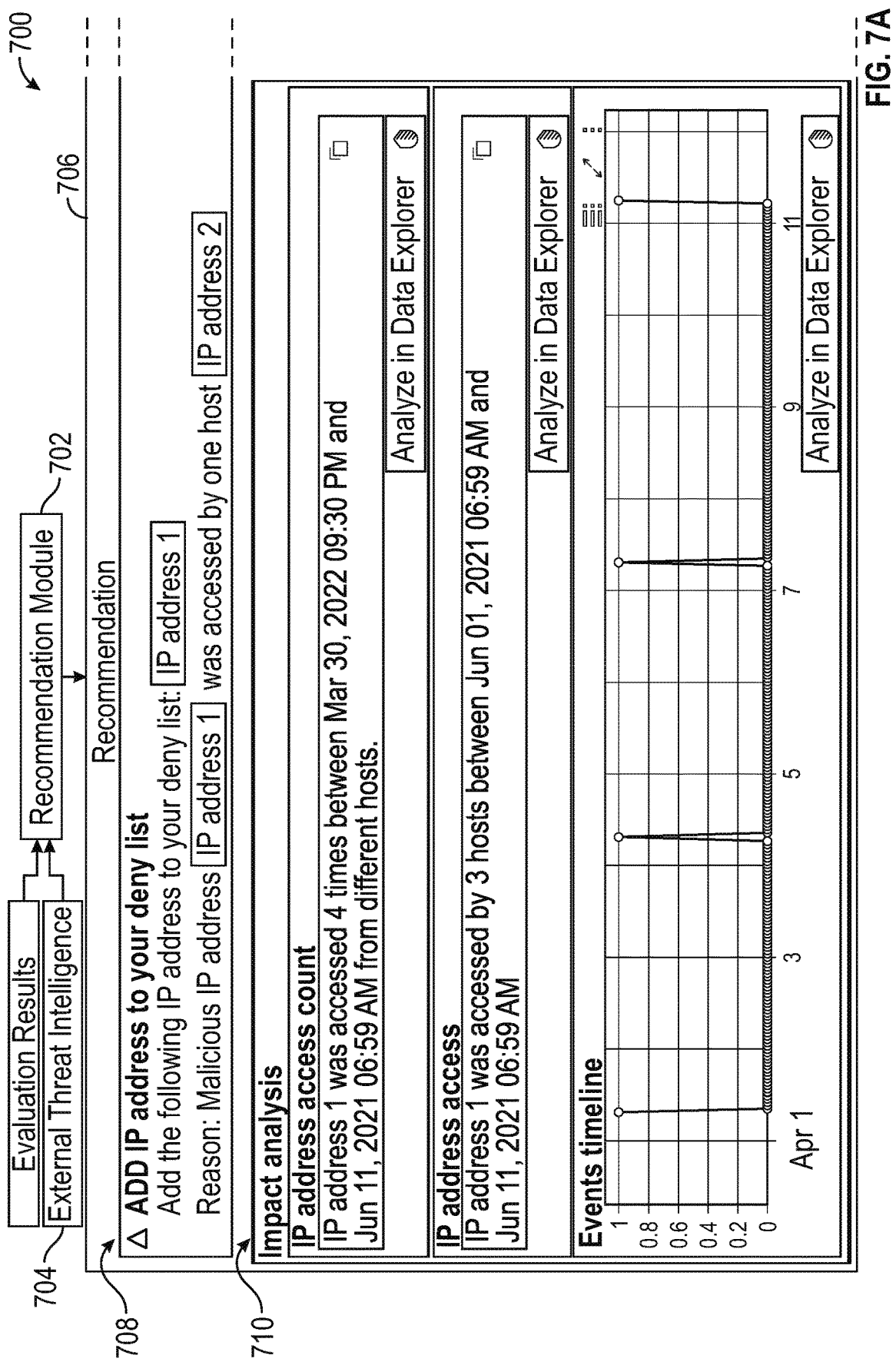
Figure 8:
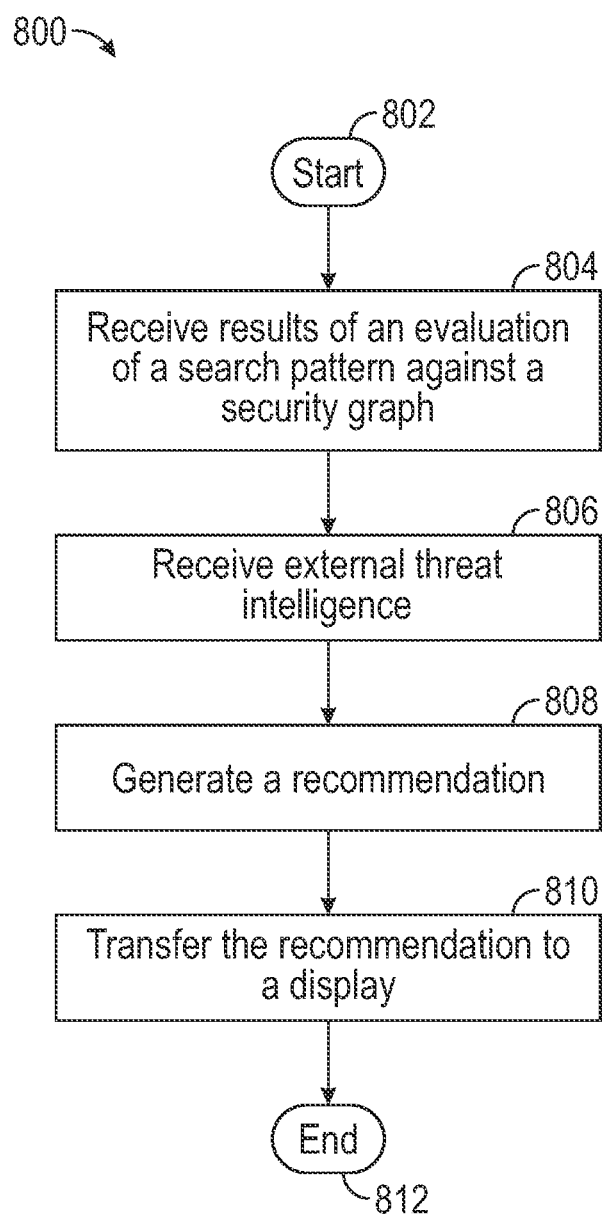
FIG. 8 illustrates a flowchart of a method of generating a recommendation, according to one embodiment.

FIGS. 7A-7B illustrate a recommendation generation environment 700, according to one embodiment. FIG. 8 illustrates a flowchart of a method of generating a recommendation 800, according to one embodiment. FIGS. 7A-7B are explained in conjunction with FIG. 8.

The method 800 begins at block 802. At block 804, the recommendation module 702 receives of an evaluation of a search pattern 304 against a security graph 206. As the recommendation module 702 receives more evaluation results, the recommendation module 702 has more data to aid in determining where the search patterns (which represent security threats) are found in the security graph 206 (which represents recorded actions and events from the document 202). In this manner, the recommendation module 702 is enabled to provide a specific, detailed recommendation 706 on how to deal with a given security threat. For example, while the traditional playbooks for security professionals to manage operations may provide general instructions to block all malicious files found during a security investigation, disclosures of the present embodiments can provide a recommendation to the detail of a specific hash of a file to block.

At block 806, the recommendation module 702 receives external threat intelligence 704. The external threat intelligence 704 can include information that is not included in the document 202 or security graph 206.

In one embodiment, the external threat intelligence 704 includes indicators of compromise from documents provided by Security Information and Event Management (SIEM) systems. The indicators of compromise can include data that indicates abnormal behavior associated with a potential security threat, such as user account privilege abuse, unexpected login activity, unknown domain name system requests, network traffic associated with IP addresses, changes in file access patterns, changes in database read/write volumes, and the like.

The external threat intelligence 704 can also include information from Endpoint Detection and Response (EDR) systems such as real-time network analytics. Further, the external threat intelligence 704 can include information about Tactics Techniques and Procedures (TTP) from security organizations. For instance, the information can include activity types typically performed by threat actors, general methods and specific steps used to perform the activities, and the like.

At block 808, the recommendation module 702 generates a recommendation 706. In one embodiment, the recommendation includes a recommendation object 708. The recommendation 706 can also include an impact analysis object 710, or a confidence rating 712.

The recommendation object 708 can include data such as text depictions of titles and descriptions of the recommendation 708 or of potential security threats, graphical depictions of tables or graphs explaining the potential security threats, selectable options to mitigate the potential security threats, and the like. In the embodiment illustrated in FIGS. 7A-7B, the recommendation object 708 includes a title that summarizes the recommendation ("Add IP address to your deny list"), details of the recommendation ("Add the following IP address to your deny list: IP address 1"), and an explanation of the reason for the recommendation ("Reason: Malicious IP address (IP address 1) was accessed by one host (IP address 2). The host has a related finding"). The recommendation object 708 also includes options to add "IP address 1" to a deny list, thereby blocking network access from "IP address 1" going forward, or to dismiss the recommendation 706.

The recommendation object 708 can also include details about the artifacts and relationships represented by the nodes and edges of the security graph 206 that were identified by the search pattern 304. These details can provide context to aid a security operator in understanding the recommendation 706. In the embodiment illustrated in FIGS. 7A-7B, the response object 708 includes an explanation of the related finding for "IP address 2." The explanation includes timestamped summary ("Large Outbound Transfer Slow Rate of Transfer") and details of a security event associated with the IP address.

As previously mentioned, the recommendation 706 can also include an impact analysis object 710. In one embodiment, the impact analysis object 710 includes information that explains how proceeding with the recommended actions could impact the computing environment 100. The impact analysis information can be generated from the external threat intelligence 704, or from internal data that tracks artifacts identified in the evaluation results.

The impact analysis information can include any security data related to the system that shows normal patterns or abnormal behavior. For instance, the impact analysis information can include data about the distribution of a file in a system, a timeline of when the file was observed in the system, network traffic analysis, and the like.

As a non-limiting example of how the impact analysis can be used, assume that a security operator is provided with a recommendation to block an IP address. If the impact analysis information shows that an IP address for a domain has regularly been accessed by hundreds of hosts in the system over the past two years, then the security operator could dismiss the recommendation, since blocking this IP address may negatively impact access to the system by authorized users. Alternatively, if the impact analysis information shows that an IP address for a domain was discovered yesterday and is being accessed by only two hosts, the security operator could follow the recommendation, since then there will likely be minimal impact from blocking the IP address.

In the embodiment illustrated in FIGS. 7A-7B, the impact analysis object 710 includes a count of the number of times that "IP address 1" was accessed over two different time periods. The impact analysis object 710 also includes a graphical depiction of a timeline of the IP accesses over a third time period.

As previously mentioned, the recommendation 706 can also include a confidence rating 712. A process for calculating a confidence rating was described above at block 612 of FIG. 6. A different confidence rating can be shown for each recommended action.

At block 810, the recommendation module 702 transfers the recommendation 706 to a display. The method 800 ends at block 812.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving scoring functions, a logical operator selection, a security graph, and external threat intelligence;
   generating a search pattern based on the scoring functions and the logical operator selection;
   evaluating the search pattern against a selected node of the security graph to identify a potential security threat represented by the security graph at the selected node; and
   generating a recommendation based on the evaluation and the external threat intelligence.

2. The method of claim 1, wherein the scoring functions are configured to:
   receive a node of the security graph;
   determine a threat score of the node based on information or alerts from metadata of the node; and
   upon determining that the threat score exceeds a threshold value, output the threat score and at least one of: a pass indicator or a fail indicator.

3. The method of claim 1, wherein the logical operator selection comprises a selection of one of: an AND operator, an OR operator, or a FOR EACH operator, and wherein the search pattern comprises a composite scoring function that includes at least two scoring functions combined with a logical operator.

4. The method of claim 1, wherein the security graph is a bidirectional graph generated based on an assessment of a document that includes a list of recorded actions recognized by software, wherein each node of the security graph can include metadata, wherein each node of the security graph represents an artifact identified from the document, and wherein each edge between two nodes of the security graph indicates a relationship between the artifacts represented by the nodes.

5. The method of claim 1, wherein the external threat intelligence includes at least one of: indicators of compromise from documents provided by Security Information and Event Management (SIEM) systems, network analytics information from Endpoint Detection and Response (EDR) systems, or Tactics Techniques and Procedures (TTP) information from security organizations.

6. The method of claim 1, further comprising:
   caching the evaluation in a memory; and
   prior to another evaluation, upon determining that a node of the search pattern has been previously evaluated against the node of the security graph, retrieving the cached evaluation from the memory.

7. The method of claim 1, wherein the recommendation comprises a recommendation object, and at least one of: an impact analysis object or a confidence rating, wherein the recommendation object includes a suggestion on actions to take to mitigate a security threat, wherein the impact analysis object includes information about an effect that following the suggestion can have on a system, wherein the confidence rating represents an assurance that a security risk identified in the recommendation is a legitimate security risk, and wherein the confidence rating is a weighted average of the scoring functions of the search pattern when evaluated against the security graph.

8. A system, comprising:
   a processor; and
   memory or storage comprising an algorithm or computer instructions, which when executed by the processor, performs an operation comprising:
      receiving scoring functions, a logical operator selection, a security graph, and external threat intelligence;
      generating a search pattern based on the scoring functions and the logical operator selection;
      evaluating the search pattern against a selected node of the security graph to identify a potential security threat represented by the security graph at the selected node; and
      generating a recommendation based on the evaluation and the external threat intelligence.

9. The system of claim 8, wherein the scoring functions are configured to:
   receive a node of the security graph;
   determine a threat score of the node based on information or alerts from metadata of the node; and
   upon determining that the threat score exceeds a threshold value, output the threat score and at least one of: a pass indicator or a fail indicator.

10. The system of claim 8, wherein the logical operator selection comprises a selection of one of: an AND operator, an OR operator, or a FOR EACH operator, and wherein the search pattern comprises a composite scoring function that includes at least two scoring functions combined with a logical operator.

11. The system of claim 8, wherein the security graph is a bidirectional graph generated based on an assessment of a document that includes a list of recorded actions recognized by software, wherein each node of the security graph can include metadata, wherein each node of the security graph represents an artifact identified from the document, and wherein each edge between two nodes of the security graph indicates a relationship between the artifacts represented by the nodes.

12. The system of claim 8, wherein the external threat intelligence includes at least one of: indicators of compromise from documents provided by Security Information and Event Management (SIEM) systems, network analytics information from Endpoint Detection and Response (EDR) systems, or Tactics Techniques and Procedures (TTP) information from security organizations.

13. The system of claim 8, the operation further comprising:
   caching the evaluation in the memory or storage; and
   prior to another evaluation, upon determining that a node of the search pattern has been previously evaluated against the node of the security graph, retrieving the cached evaluation from the memory or storage.

14. The system of claim 8, wherein the recommendation comprises a recommendation object, and at least one of: an impact analysis object or a confidence rating, wherein the recommendation object includes a suggestion on actions to take to mitigate a security threat, wherein the impact analysis object includes information about an effect that following the suggestion can have on a system, wherein the confidence rating represents an assurance that a security risk identified in the recommendation is a legitimate security risk, and wherein the confidence rating is a weighted average of the scoring functions of the search pattern when evaluated against the security graph.

15. A computer-readable storage medium having computer-readable program code embodied therewith, the computer-readable program code executable by one or more computer processors to perform an operation comprising:

receiving scoring functions, a logical operator selection, a security graph, and external threat intelligence;

generating a search pattern based on the scoring functions and the logical operator selection;

evaluating the search pattern against a selected node of the security graph to identify a potential security threat represented by the security graph at the selected node; and generating a recommendation based on the evaluation and the external threat intelligence.

16. The computer program product of claim 15, wherein the scoring functions are configured to:

receive a node of the security graph;

determine a threat score of the node based on information or alerts from metadata of the node; and upon determining that the threat score exceeds a threshold value, output the threat score and at least one of: a pass indicator or a fail indicator.

17. The computer program product of claim 15, wherein the logical operator selection comprises a selection of one of: an AND operator, an OR operator, or a FOR EACH operator, and wherein the search pattern comprises a composite scoring function that includes at least two scoring functions combined with a logical operator.

18. The computer program product of claim 15, wherein the security graph is a bidirectional graph generated based on an assessment of a document that includes a list of recorded actions recognized by software, wherein each node of the security graph can include metadata, wherein each node of the security graph represents an artifact identified from the document, and wherein each edge between two nodes of the security graph indicates a relationship between the artifacts represented by the nodes.

19. The computer program product of claim 15, the operation further comprising:

caching the evaluation in a memory; and prior to another evaluation, upon determining that a node of the search pattern has been previously evaluated against the node of the security graph, retrieving the cached evaluation from the memory.

20. The computer program product of claim 15, wherein the recommendation comprises a recommendation object, and at least one of: an impact analysis object or a confidence rating, wherein the recommendation object includes a suggestion on actions to take to mitigate a security threat, wherein the impact analysis object includes information about an effect that following the suggestion can have on a system, wherein the confidence rating represents an assurance that a security risk identified in the recommendation is a legitimate security risk, and wherein the confidence rating is a weighted average of the scoring functions of the search pattern when evaluated against the security graph.

* * * * *